US004001620B2

United States Statutory Invention Registration [19]

[11] Reg. Number: H1620

Dolan et al.

[45] Published: Dec. 3, 1996

[54] DRY CHOCOLATE FLAVORED BEVERAGE MIX

[76] Inventors: Kenneth M. Dolan; Donald L. Hughes; Kimberly A. Leavell; Robert L. Swaine, Jr.; Mariaelena Z. Hayes, all of The Procter & Gamble Company, 6071 Center Hill Ave., Cincinnati, Ohio 45224-1703

[21] Appl. No.: 465,042

[22] Filed: Jun. 6, 1995

Related U.S. Application Data

[63] Continuation of Ser. No. 227,434, Apr. 14, 1994, abandoned.

[51] Int. Cl.[6] ..... A23C 21/04

[52] U.S. Cl. ..... 426/593; 426/72; 426/74; 426/580; 426/583

[58] Field of Search ..... 426/72, 74, 593, 426/583, 580

[56] References Cited

U.S. PATENT DOCUMENTS

| | | | |
|---|---|---|---|
| 3,058,828 | 10/1962 | Lindblad | 426/593 |
| 3,615,659 | 10/1971 | Weber | 99/26 |
| 4,081,567 | 3/1978 | Haber | 426/580 |
| 4,337,278 | 6/1982 | Brog | 426/583 |
| 4,397,927 | 8/1983 | Brog | 426/583 |
| 4,446,164 | 5/1984 | Brog | 426/583 |
| 4,882,181 | 11/1989 | Giddey et al. | 426/74 |
| 4,910,035 | 3/1990 | Ellis | 426/584 |
| 4,980,193 | 12/1990 | Tuason, Jr. et al. | 426/573 |
| 5,002,779 | 3/1991 | Mehansho et al. | 426/593 |
| 5,080,921 | 1/1992 | Reimer | 426/564 |
| 5,264,228 | 11/1993 | Pray et al. | 426/593 |
| 5,284,674 | 2/1994 | Fazio | 426/580 |

OTHER PUBLICATIONS

Jr. League of Macon Georgia, 1982, *Gracious Goodness,* Wimmer Brothers Fine Printing and Lithography, Memhis, TN, p. 51.

Douglas, Jr., Rainey, Wong, Edmondson and LaCroix; *Color, Flavor, and Iron Bioavailability in Iron–Fortified Chocolate Milk;* Journal of Dairy Science, vol. 64, No. 9, 1981, pp. 1785–1793.

*Primary Examiner*—Harvey E. Behrend
*Assistant Examiner*—John R. Hardee

[57] ABSTRACT

Disclosed is a dry chocolate-flavored beverage mix and a process for making it. The dry beverage mix comprises from about 3% to about 13% by weight of cocoa powder, from about 40% to about 60% by weight of particulate sugar, from about 3% to about 5% by weight of caramel powder, from about to about 20% by weight of malt extract, from about 0.25% to about 1.0% by weight of flavor enhancing salt, from about 10% to about 32% by weight of a powdered non-dairy creamer wherein the non-dairy creamer contains from about 40% to about 60% vegetable fat by weight of the non-dairy creamer, from about 0.02% to about 3.0% by weight of a thickening agent, from 0 to about 1.0% by weight of added lecithin, an effective amount of an antioxidant, less than about 6% by weight of moisture, from 0 to about 20% by weight of an added protein source, and nutritionally supplemental amounts of vitamins and minerals.

15 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DRY CHOCOLATE FLAVORED BEVERAGE MIX

This is a continuation of application Ser. No. 08/227,434, filed on Apr. 14, 1994, now abandoned.

FIELD OF THE INVENTION

The present invention relates to a dry chocolate flavored beverage mix and a process for making it. Such a dry beverage mix does not require substantial amounts of added milk or whey solids, and can be reconstituted with tap water to deliver a chocolate flavored beverage with certain milk-like organoleptic properties.

BACKGROUND OF THE INVENTION

Many chocolate flavored milk-based beverage formulations are known. Among these formulations are dry beverage mixes which can be diluted prior to consumption to form a chocolate flavored milk-based beverage. These chocolate flavored milk-based beverages, referred to generically by consumers as "chocolate milk," are especially popular among children. Given the potential level of protein, mineral and vitamin fortification possible in such beverages, these beverages can be an excellent source of nutrition for children, especially children in developing countries where daily nutrition is a serious, ongoing concern.

Chocolate flavored milk-based beverages are normally marketed as chilled chocolate flavored milk or as dry chocolate-flavored beverage mixes which can be reconstituted with milk, powdered milk and water, or water. Such reconstituted chocolate flavored beverages will normally contain milk solids in order to provide milk-like organoleptic properties and protein fortification. Milk solids, however, are relatively expensive and add substantially to the cost of the dry beverage mixes. Such costs can be reduced by replacing some or all of the milk solids in the dry beverage mixes with whey solids. Whey can provide protein fortification to the dry beverage mixes and it is an inexpensive, abundant raw material. Whey solids, however, often contribute an objectionable off-flavor to beverages. Whey-based beverages also have a watery texture that is readily distinguishable from that of the more desirable, creamy, milk-based beverages. Accordingly, consumers have rejected whey-based beverages or have simply added whole milk or milk solids to the product prior to consumption to improve its organoleptic profile. The addition by consumers of such milk solids, e.g., dehydrated milk, is expensive and inconvenient. Manufactures have responded by making whey-based chocolate flavored beverage mixes with enough milk solids to satisfy consumer tastes. Consumers prefer these products but many cannot easily afford them.

Accordingly, there is a continuing need to provide an inexpensive dry chocolate flavored beverage mix that can be reconstituted with tap water to deliver a beverage that tastes like "chocolate milk" and does not require substantial amounts of milk or whey solids. It is therefore an object of the present invention to provide such a dry chocolate flavored beverage mix and a process for preparing it, and further to provide such a dry beverage mix which is fortified with minerals and vitamins, and preferably also fortified with added protein.

SUMMARY OF THE INVENTION

In its product aspects, the dry chocolate flavored beverage mix of the present invention comprises from about 3% to about 13% by weight of cocoa powder, from about 40% to about 60% by weight of particulate sugar, from about 3% to about 5% by weight of caramel powder, from about 10% to about 20% by weight of malt extract, from about 0.25% to about 1.0% by weight of sodium chloride, from about 10% to about 32% by weight of a powdered non-dairy creamer wherein the creamer contains from about 40% to about 60% of vegetable fat by weight of the creamer, from about 0.02% to about 3.0% by weight of a thickening agent, from 0 to about 1.0% by weight of lecithin, an effective amount of an antioxidant, less than about 6% by weight of moisture, from 0 to about 20% by weight of an added protein source, and a nutritionally supplemental amount of nutrients selected from the group of vitamin A, vitamin C, vitamin D, vitamin E, thiamine, riboflavin, niacin, pantothenic acid, folic acid, iron, iodine, calcium, sodium, magnesium, zinc, potassium, phosphorous and mixtures thereof.

In its process aspects, the present invention comprises admixing the above described essential ingredients. The resulting dry chocolate flavored beverage mix can be reconstituted with hot or cold water to form a chocolate flavored beverage with milk-like organoleptic (e.g., flavor and texture) properties.

Particularly important aspects of the dry beverage mix herein is the combination of sugar, cocoa powder, malt extract, caramel powder and thickening agents in the above described percentages. It was found that this combination is largely responsible for the "chocolate milk" like properties that heretofore were not possible without the use of substantial amounts of milk solids. Another important aspect of the composition herein is the use of a powdered non-dairy creamer. This material is relatively inexpensive and contributes a milk-like texture to the beverage product.

DETAILED DESCRIPTION OF THE INVENTION

The present invention relates to dry chocolate flavored beverage mixes, and processes for making them, which mixes can be diluted with water to prepare a chocolate flavored beverage with chocolate milk-like organoleptic properties.

As used herein, "chocolate milk-like organoleptic properties" are those taste and textural (mouthfeel) characteristics that consumers generally associate with typical chocolate milk beverages.

As used herein, the term "comprising" means various components conjointly employed in the preparation of the dry chocolate flavored beverage mix of the present invention. Accordingly, the terms "consisting essentially of" and "consisting of" are embodied in the term "comprising."

As used herein, all parts, percentages and ratios are based on weight unless otherwise specified.

Cocoa Powder

The dry beverage mix of the present invention comprises from about 3% to about 13%, preferably from about 4% to about 10%, by weight of cocoa powder.

The cocoa powder for use in the dry beverage mix can be natural or "dutched" chocolate, or washed or fermented cocoa powder, from which a substantial portion of the fat or cocoa butter has been expressed or removed by solvent extraction, by pressing, or by other means. Cocoa powder suitable for use in the dry beverage mix herein may generally contain from 1–20% fatty constituents.

Dutched chocolate powder is prepared by treating cocoa nibs with alkaline material such as potassium carbonate in a manner well known in the art. Generally, it tends to have a darker color and also can be more flavorful than natural cocoas.

Fermented cocoa powder can also be used. This cocoa powder is prepared by fermenting green cocoa beans before roasting and milling. The fermentation is usually conducted by soaking the green beans in water for a week and then drying.

Especially preferred is alkalized cocoa powder that when reconstituted with water exhibits a pH 7 or above. Unlike natural cocoa powder which has a pH of about 5.0, alkalized cocoa powder has a strong chocolate flavor and has little or no astringency, or cereal flavor notes. We have found that, from a consumer standpoint, the alkalized cocoa powder is more preferred when utilized in the dry beverage mix herein.

Particulate Sugar

The dry beverage mix of the present invention further comprises from about 40% to about 60%, preferably from about 50% to about 60%, by weight of particulate sugar. Suitable particulate sugars can be granulated or powdered, and can include sucrose, fructose, dextrose, maltose, lactose and mixtures thereof. Most preferred is sucrose.

In addition to the added particulate sugar in the dry beverage mix, other natural or artificial sweeteners can also be incorporated therein. Other suitable sweeteners include saccharin, cyclamates, acetosulfam, L-aspartyl-L-phenylalanine lower alkyl ester sweeteners (e.g. aspartame), L-aspartyl-D-alanine amides disclosed in U.S. Pat. No. 4,411,925 to Brennan et al., L-aspartyl-D-serine amides disclosed in U.S. Pat. No. 4,399,163 to Brennan et al., L-aspartyl-L-hydroxymethylalkaneamide sweeteners disclosed in U.S. Pat. No. 4,338,346 to Brand, L-aspartyl-1-hydroxyethylkaneamide sweeteners disclosed in U.S. Pat. No. 4,423,029 to Rizzi, L-aspartyl-D-phenylglycine ester and amide sweeteners disclosed in European Patent Application 168,112 to J. M. Janusz, published Jan. 15, 1986, and the like. A particularly preferred optional and additional sweetener is aspartame.

Beverage Premix

The dry beverage mix of the present invention further comprises the following other ingredients. As described hereinafter, these other ingredients are preferably incorporated into a beverage premix that is then combined with the above described cocoa powder and particulate sugar. These other ingredients are described in detail as follows.

A. Caramel Powder

The dry beverage mix herein comprises from about 3% to about 5%, preferably from about 3.5% to about 4.5%, by weight of caramel powder. Known or conventional caramel powders can be used.

Conventional caramel powders have a characteristic vanilla caramel flavor and appear as a light brown powder. Such powders normally contain corn syrup, sugar, skim milk, maltodextrin, whey, partially hydrogenated cottonseed oil, salt and natural flavor.

It was found that the caramel powder provides organoleptic properties commonly associated with milk-based products. These properties were especially similar to that of milk-based products when the caramel powder was combined with malt extract in the dry beverage mix herein.

Caramel powders will typically provide minimal amounts of milk solids and whey to the dry beverage mix. Such powders typically contain 5–7% by weight of milk solids and 2–5% by weight of whey. A typical caramel powder, for example, might contain about 6.6% milk solids and 3.9% whey. In a reconstituted beverage product, this will amount to about 0.4% by weight of milk solids. Whole fluid milk inherently contains between about 11.8% and 15.0% by weight of milk solids.

B. Malt extract

The dry beverage further comprises from about 10% to about 20%, preferably from about 12% to about 18%, by weight of dry malt extract. Such extract is well known in the art and is commonly incorporated into various beverage products.

As in the case of the added caramel powder, it was found that the added malt extract provides certain organoleptic properties commonly associated with chocolate milk. When combined with the caramel powder and cocoa powder, the dry beverage mix exhibits many organoleptic properties that consumers commonly associate with "real" chocolate milk.

C. Flavor enhancing salt

The dry beverage mix further comprises from about 0.25% to about 1.0% by weight of a flavor enhancing salt, preferably sodium chloride. As in milk itself, the flavor enhancing salt, typically sodium chloride, provides body to the reconstituted beverage. This helps eliminate the typical watery texture associated with reconstituted chocolate flavored beverages that contain substantially no milk solids. Salt concentrations less than 0.25% by weight are insufficient to provide the requisite mouthfeel or body while concentrations above 1.0% by weight result in an excessive salty flavor. A sodium chloride concentration of about 0.34% by weight is optimal for providing the inherent body and saltiness of milk.

D. Non-dairy creamer

The dry beverage mix further comprises from about 10% to about 32%, preferably from about 15% to about 20%, by weight of a powdered non-dairy creamer, wherein the non-dairy creamer comprises from about 40% and about 60%, preferably from about 45% to about 55%, vegetable fat by weight of the non-dairy creamer (based on dry weight). As used herein, the terms vegetable "oil" and "fat" are used interchangeably.

It was found that the powdered non-dairy creamer component of the dry beverage mix will provide a texture characteristic, e.g., mouthfeel, similar to that of dehydrated or powdered milk. Powdered non-dairy creamers are relatively inexpensive as compared to milk solids or dehydrated milk.

Known or conventional non-dairy creamers can be used in the dry beverage mix provided that they satisfy the above described criteria. Non-dairy creamers with vegetable fat concentrations above about 60% by weight are difficult to maintain in emulsified form for extended periods when the dry beverage mix is reconstituted with water, especially water at a temperature of above about 65° C. At vegetable fat levels below about 40% by weight, the reconstituted chocolate flavored beverage exhibits an excessively watery texture/mouthfeel.

Especially preferred are powdered non-dairy creamers wherein the vegetable fat component is coconut oil. Such coconut oil-based non-dairy creamers deliver to the dry beverage mix a more milk-like flavor and texture when diluted with water.

Other components of the non-dairy creamer will often include, but are not limited to, carbohydrate carriers such as corn syrup solids, emulsifier, flow agents, antioxidants, preservatives and lecithin.

E. Thickening agent

The dry beverage mix further comprises from about 0.02% to about 3%, preferably from about 0.3% to about 2.5%, by weight of a thickening agent. Known or conventional thickening agents can be used. The thickening agent in the dry beverage mix enhances the milk-like texture characteristics provided by the powdered non-dairy creamer component. The thickening agent also helps prevent sedimentation of the reconstituted dry beverage mix.

Any food grade thickening agent can be used in the dry beverage mix provided that it is compatible with the other essential ingredients therein. Suitable thickening agents include, but are not limited to, carboxymethylcellulose (CMC), carrageenan, xanthan, pectin, guar and various food starches (modified and unmodified). Selection of the thickening agent will be determined primarily by cost, and secondarily to thickening-enhancing characteristics. CMC is preferred from a cost standpoint.

F. Lecithin

The dry beverage mix may further comprise from 0% to about 1.0%, preferably from about 0.2% to about 0.5%, by weight of added lecithin. The added lecithin improves wettability of the dry beverage mix and reduces dustiness during manufacturing.

The optional added lecithin described herein does not include amounts of lecithin which may inherently be part of other materials, e.g., powdered non-dairy creamer, in the dry beverage mix. Accordingly, total lecithin concentrations in the dry beverage mix can exceed the above described lecithin concentrations.

G. Antioxidant

The beverage premix further comprises a food grade antioxidant in an amount sufficient to inhibit oxidation of materials, especially lipids, in the dry beverage mix. Excessive oxidation can contribute to off-flavor development and flavor loss in the dry beverage mix. Excessive oxidation can also lead to degradation and inactivation of any ascorbic acid in the dry beverage mix.

Known or conventional food grade antioxidants can be used in the dry beverage mix. Such food grade antioxidants include, but are not limited to, butylated hydroxyanisole (BHA), butylated hydroxytoluene (BHT), and mixtures thereof. Selection of an effective amount or concentration of a food grade antioxidant is easily determined by the skilled artisan. Limitations on such amounts or concentrations are normally subject to government regulations.

To further enhance oxidative stability, the dry beverage mix should be packaged in a moisture impervious container. Such containers include, for example, foil lined packages, metal cans and plastic or laminated packages. Foil lined packages or other oxygen and water impermeable containers are preferred. The dry beverage mix can be packaged under nitrogen, carbon dioxide or other inert non-oxidizing gases to further enhance oxidative stability. Such packaging methods are well known in the art. Moisture content should not exceed about by weight of the dry beverage mix.

H. Protein source

The dry beverage mix may further comprise from 0 to about 20%, preferably from about 1% to about 20%, more preferably from about 5% to about 15%, of a protein source. Such protein fortification is especially important if the beverage products described herein are consumed in place of the traditional, but typically expensive, protein-containing beverages such as chocolate flavored milk.

Suitable protein sources for use in the dry beverage mix include, but are not limited to, vegetable sources such as soy protein concentrate and isolate, pea protein, corn protein (zein) and rice protein, and dairy sources such as lactalbumin, casein, whey solids (sweet dairy whey) and dehydrated or non-fat milk powders. Whey protein concentrates can also be used. Such concentrates can enhance protein content without unduly increasing product volume and color. Preferred from a cost standpoint are vegetable sources and sweet dairy whey solids, more preferably sweet dairy whey solids.

Sweet dairy whey solids typically contain less than about 6% by weight of water, and typically comprise from 10–13% by weight of protein (lactalabumin and lactoglobulin), 70–75% lactose, 2–4% lactic acid and 7–10% ash (includes calcium, potassium, sodium, iron, magnesium, copper and phosphate salts).

Sweet dairy whey as an inexpensive protein source can be obtained or prepared from conventional sources. Whey is most commonly obtained as a byproduct from cheese manufacturing. Sweet dairy whey, in particular, is obtained from the manufacture of Swiss, mozzarella, Monterey jack, cheddar and similar types of cheese resulting from the action of rennin, pepsin or vegetable derived enzymes on casein. Such cheese products consist almost entirely of precipitated milk fat and casein protein. By contrast, the principal components of sweet dairy whey are milk sugar (lactose) and non-casein protein (primarily lactalbumin).

The incorporation of sweet dairy whey into the dry beverage mix herein does not result in excessive off-flavors and watery texture in the diluted beverage product. As stated hereinbefore, many of chocolate milk-like organoleptic properties (e.g., taste, creamy mouthfeel) are provided by the other essential elements of the dry beverage mix and are not substantially compromised by the incorporation of sweet dairy whey therein.

It is understood that the dry beverage mix can, but preferably does not, contain added milk solids (e.g, as dried or nonfat dried milk) as the protein source. Even without added milk solids, the dry beverage mix when diluted with water exhibits chocolate milk-like properties that many consumers prefer. Small amounts of milk and whey solids are inherently in the caramel powder component of the dry beverage mix, but such amounts represent less than about 1% milk solids by weight of the reconstituted beverage. By contrast, whole fluid milk inherently contains between 11.8% and 15% by weight of milk solids.

I. Vitamin and minerals

The dry beverage mix further comprises nutritionally supplemental amounts of vitamins and minerals. As used herein, "nutritionally supplemental amounts" are amounts of vitamins and minerals used in the dry beverage mix herein which provide a nourishing amount of the minerals and vitamins. As used herein, "nutrients" refer generally to minerals and vitamins.

The U.S. Recommended Daily Allowance (RDA) for vitamins and minerals are defined and set forth in the Recommended Daily Dietary Allowance-Food and Nutrition Board, National Academy of Sciences-National Research Council. A serving size of about 38 grams of the dry beverage mix is used to calculate RDA values herein.

As used herein, a nutritionally supplemental amount of minerals is at least about 3%, preferably from about 10% to about 100%, of the RDA of such minerals. As used herein, a nutritionally supplemental amount of vitamins is at least about 10%, preferably from about 20% to about 150%, more preferably from about 30% to 100%, of the RDA of such vitamins.

It is recognized, however, that the preferred daily intake of any vitamin or mineral may vary with the user. For example, persons suffering with anemia may require an increased intake of iron. Persons suffering vitamin deficiencies or who have poor diets will require more vitamins A, C and riboflavin, particularly growing children in developing countries. Such matters are familiar to physicians and nutritional experts, and usage of the compositions of the present invention may be adjusted accordingly.

Current RDA values for most healthy adults are generally: vitamin C (60mg), vitamin A as retinol (1 mg) or as β-carotene (6 mg), riboflavin (1.7 mg), niacin (20 mg), thiamine (1.5 mg), vitamin $B_6$ (2.0 mg), folic acid (0.4 mg), vitamin $B_{12}$ (6 μg), and vitamin E (30 international units).

RDA for iron generally range from 10 mg per 6 kg to 18 mg per 54–58 kg female, depending somewhat on age. Iron fortified foods and beverages typically contain 10–25% RDA of iron (based per serving) to account for iron which is available from other dietary sources (assuming a reasonably balanced diet). RDA for calcium will range from 360 mg per 6 kg for infants to 1200 mg per 54–58 kg female, depending somewhat on age. Moreover, it can be difficult to supplement beverages with more than 20–30% RDA of calcium (based per serving) without encountering precipitation and or organoleptic problems. However, this level of supplementation is equivalent to that provided by cow's milk, and is therefore acceptable.

Commercially available sources of vitamin C can be used herein. Encapsulated ascorbic acid and edible salts of ascorbic acid can also be used. Preferably, from about 25% to about 300% of the RDA is used in the dry beverage mix (15 mg per 240 gm of diluted beverage or 0.006% to about 80 mg per 240 gm of dilute beverage or 0.075%). Most preferably, the amount of vitamin C used in the dry beverage mix is from about 25% to about 150% of the RDA.

Commercially available vitamin A sources can also be incorporated into the dry beverage mix. A single serving most preferably contains from about 10% to about 50% of the RDA of vitamin A. Vitamin A can be provided, for example, as vitamin A palmitate and or as beta-carotene.

Commercially available sources of riboflavin can be used herein. The resulting dry beverage mix preferably contains (per serving) from about 20% to about 200% of the RDA of riboflavin, which amounts to about 0.34 mg riboflavin per 240 gm diluted beverage to 3.4 mg per 240 gm of diluted beverage.

Nutritionally supplemental amounts of other vitamins for incorporation into the dry beverage mix include, but are not limited to, vitamins $B_6$ and $B_{12}$, niacin, pantothenic acid, folic acid, and vitamins D and E. Other vitamins can also be incorporated into the dry beverage mix depending on the nutritional needs of the consumers to which the beverage product is directed.

Nutritionally supplemental amounts of other minerals for incorporation into the dry beverage mix include, but are not limited to, calcium, zinc and copper. Any water soluble salt of these minerals can be used, e.g., zinc chloride, zinc sulfate, copper sulfate. A preferred calcium source is a calcium citratemalate composition described in U.S. Pat. No. 4,789,510, U.S. Pat. No. 4,786,518 and U.S. Pat. No. 4,822,847.

J. Other ingredients

The dry chocolate flavored beverage mix can further comprise other ingredients commonly used in food or beverage products to provide flavor, aesthetics, texture, stability or nutrition benefits. As described hereinafter, such optional other ingredients will typically be incorporated into the beverage premix, although such ingredients can also be incorporated individually or in various combinations into the dry beverage mix.

Such optional other ingredients can include, for example, natural and artificial colors and flavors. Optional flavorants can be especially beneficial in tailoring the flavor profile of the beverage product to special consumer preferences in a particular geographical region.

Dry Beverage Mix

The dry beverage mix of the present invention can be diluted with water, powdered milk and water, or milk. Dilution with water is preferred. Water-diluted product exhibits chocolate-milk like organoleptic characteristics, is convenient for consumers to prepare (e.g., just add water), and is less expensive than product diluted with milk or reconstituted powdered milk.

The dry beverage mix of the present invention is a flowable particulate composition containing not more than about 6% by weight of moisture.

A single serving size of the dry beverage mix will vary with individual consumer preference and with the specific dry beverage mix formulation. It is especially important that the product formulation delivers the desired amount of vitamins, minerals and protein per single serving of the diluted beverage product. Generally, a single serving of the dry beverage mix will be from about 30 to about 45 grams, most typically about 38 grams.

Preparation of a chocolate flavored beverage from the dry beverage mix will involve the addition of from about 3 to about 10 parts of diluent (e.g., tap water), preferably from about 6 to about 8 parts of diluent, per I part of dry beverage mix. The diluent can be hot or cold. Typically, about 240 ml of diluent will be added per single serving of the dry beverage mix to form a reconstituted chocolate flavored beverage.

Preparation

The process of the present invention can be used to prepare the dry beverage mix described hereinbefore. This process comprises admixing the requisite amounts of essential ingredients of the dry beverage mix described hereinbefore.

Preferably, the process comprises dry mixing the cocoa powder and the particulate sugar in an isolated admixture, mixing all other ingredients as an isolated premix, and then dry mixing the two isolated admixtures to form the dry beverage mix of the present invention. The cocoa powder and particulate sugar are preferably admixed together to allow the fine cocoa particles to adhere around the sugar particles. This will improve dispersability of the dry beverage mix when reconstituted with water. Lecithin can be added to the cocoa powder-sugar admixture to control dustiness.

The physical form of the dry beverage mix can be tailored according to consumer preferences. For example, the dry beverage mix can be processed into a less dense, agglomerated mixture or left as a fine powder.

Comparative Data

The following beverages A, B and C were prepared and consumer tested. Beverages A and B were prepared in accordance with normal consumer usage patterns. Beverage C was prepared from a dry beverage mix of the present invention and an optimal amount of added water. Added water temperatures were 65° C. for each beverage A, B and C.

Beverage A

| Added ingredients | Amount |
|---|---|
| Milo ™ drink mix | 28 gm |
| Whole milk powder | 14 gm |
| Granulated sucrose | 8.2 gm |
| Water | 240 ml |

(Milo ™ available from Societe Des Produits Nestle S.A., Switzerland)
(Milo ™ labeled ingredients are sugar, extract of malted barley and other cereals, milk solids, cocoa, vegetable oil [one or more of palm oil, palmolein, coconut oil, palm kernal oil, corn oil], lecithin, calcium phosphate, dimagnesium phosphate, disodium phosphate, sodium bicarbonate, iron pyrophosphate, vanillin, added vitamins)

| Beverage B | |
|---|---|
| Added ingredients | Amount |
| Ovaltine ™ | 28 gm |
| Whole milk powder | 14 gm |
| Granulated sucrose | 8.2 gm |
| Water | 240 ml |

(Ovaltine ™ available from Wander LTD., Switzerland)
(Ovaltine ™ labeled ingredients are sugar, malt extract, milk solids, cocoa, corn syrup, honey, caramel, egg powder, lecithin, vanilla and vitamin/mineral enriched)

| Beverage C | |
|---|---|
| Added ingredients | Amount |
| Water | 240 ml |
| Dry beverage mix | 42 gm(approximate) |
| (Ingredients in dry beverage mix are: | |
| Granulated sucrose | 21.2 gm |
| Powdered non-dairy creamer (50% coconut oil) | 8.0 gm |
| Alkalized cocoa powder (11–12% fat) | 1.5 gm |
| Malt extract | 8.0 gm |
| Caramel powder | 1.8 gm |
| Vanillin(flavorant) | 0.015 gm |
| Sodium chloride | 0.145 gm |
| Thickening agent | 0.8995 gm |
| Vitamin/mineral premix | 0.91 gm |
| Lecithin | 0.10 gm |
| Antioxidant | 0.006 gm |
| Water | <2.5 gm |

Results from the above described consumer tests are set forth below in Table 1.

TABLE 1

| Consumer Product Rating | | |
|---|---|---|
| Beverage | Milk solids (wt %) | Overall Product Rating (0–100) |
| A | 24 | 55 |
| B | 16.5 | 56 |
| C | <1.0 | 62 |

As shown in Table 1, Beverage C received a superior overall product rating compared to Beverages A and B (statistically significant superiority at confidence). This statistically significant superiority was quite remarkable given that Beverage C contained less than 1% by weight of milk solids while Beverages A and B contained 24% and 16.5% by weight of milk solids.

EXAMPLES

Preferred embodiments of the dry beverage mix of the present invention, and processes for making it, are set forth hereinafter. These embodiments are illustrative of the present invention and are not intended to be limiting of it.

EXAMPLE I

| Ingredient | (wt % dry basis) |
|---|---|
| Sucrose granules | 50.1 |
| Non-dairy creamer (50% veg. fat) | 18.7 |
| Malt extract | 12.0 |
| Alkalized cocoa powder | 8.5 |

-continued

| Ingredient | (wt % dry basis) |
|---|---|
| Sweet dairy whey | 5.0 |
| Caramel powder | 4.2 |
| Sodium chloride | 0.6 |
| Vitamin & mineral supplement | 0.31 |
| Lecithin | 0.3 |
| CMC | 0.25 |
| BHT | 0.015 |

The Example 1 product is prepared by dry mixing the lecithin and the particulate sugar, followed by the cocoa powder. The remaining ingredients are admixed in an isolated admixture and then dry mixed with the sugar/lecithin/cocoa powder admixture. The resulting dry beverage mix contains less than 6% by weight of moisture.

EXAMPLE 2

A dry beverage mix according to Example 1 except that the added whey solids are replaced with an equal amount of milk solids. The dry beverage mix is prepared by the admixture process described in Example 1.

EXAMPLE 3

A dry beverage mix according to Example 1 except that the added whey solids are replaced with an equal volume of soy protein concentrate or isolate. The dry beverage mix is prepared by the admixture process described in Example 1.

What is claimed is:

1. A dry chocolate-flavored beverage mix comprising:

(a) from about 3% to about 13% by weight of cocoa powder;

(b) from about 40% to about 60% by weight of particulate sugar;

(c) from about 3% to about 5% by weight of caramel powder;

(d) from about 10% to about 20% by weight of malt extract;

(e) from about 0.25% to about 1.0% by weight of flavor enhancing salt;

(f) from about 10% to about 32% by weight of a powdered non-dairy creamer, wherein the non-dairy creamer contains from about 40% to about 60% vegetable fat by weight of the non-dairy creamer;

(g) from about 0.02% to about 3.0% by weight of a thickening agent;

(h) from 0 to about 1.0% by weight of added lecithin;

(i) an effective amount of an antioxidant;

(j) less than about 6% by weight of moisture;

(k) from 0 to about 20% by weight of an added protein source selected from the group consisting of soy protein concentrate, soy protein isolate, pea protein, corn protein, rice protein, lactalbumin, casein, whey solids, dehydrated milk powders, non-fat milk powders and whey protein concentrates; and (l) nutritionally supplemental amounts of nutrients selected from the group consisting of Vitamin A, Vitamin C, Vitamin D, Vitamin E, thiamine, riboflavin, niacin, pantothenic acid, folic acid, iron, iodine, calcium, magnesium, zinc, potassium, phosphorous and mixtures thereof.

2. The dry beverage mix of claim 1 wherein said beverage mix comprises:

(a) from about 4% to about 10% by weight of cocoa powder;

(b) from about 50% to about 60% by weight of particulate sugar;

(c) from about 3.5% to about 4.5% by weight of caramel powder; and (d) from about 12% to about 18% by weight of malt extract.

3. The dry beverage mix of claim 2 wherein the powdered non-dairy creamer comprises between about 45% and 55% vegetable fat by weight of the non-dairy creamer.

4. The dry beverage mix of claim 3 wherein the vegetable fat is coconut oil.

5. The dry beverage mix of claim 2 wherein the flavor enhancing salt is sodium chloride, the particulate sugar is sucrose and the thickening agent is carboxymethylcellulose.

6. The dry beverage mix of claim 2 wherein said dry beverage mix comprises from about 1% to about 20% by weight of sweet dairy whey solids as the added protein source.

7. The dry beverage mix of claim 6 wherein said dry beverage product comprises from about 5% to about 15% by weight of sweet dairy whey solids.

8. A process for making a dry chocolate-flavored beverage mix, which process comprises admixing:

(a) from about 3% to about 13% by weight of cocoa powder;

(b) from about 40% to about 60% by weight of particulate sugar;

(c) from about 3% to about 5% by weight of caramel powder;

(d) from about 10% to about 20% by weight of malt extract;

(e) from about 0.25% to about 1.0% by weight of flavor enhancing salt;

(f) from about 10% to about 32% by weight of a powdered non-dairy creamer, wherein the non-dairy creamer contains from about 40% to about 60% vegetable fat by weight of the non-dairy creamer;

(g) from about 0.02% to about 3.0% by weight of a thickening agent;

(h) from 0 to about 1.0% by weight of added lecithin;

(i) an effective amount of an antioxidant;

(j) less than about 6% by weight of moisture;

(k) from 0 to about 20% by weight of an added protein source selected from the group consisting of soy protein concentrate, soy protein isolate, pea protein, corn protein, rice protein, lactalbumin, casein, whey solids, dehydrated milk powders, non-fat milk powders and whey protein concentrates; and (l) nutritionally supplemental amounts of nutrients selected from the group consisting of Vitamin A, Vitamin C, Vitamin D, Vitamin E, thiamine, riboflavin, niacin, pantothenic acid, folic acid, iron, iodine, calcium, magnesium, zinc, potassium, phosphorous and mixtures thereof.

9. The process of claim 8 wherein said process comprises admixing:

(a) from about 4% to about 10% by weight of cocoa powder;

(b) from about 50% to about 60% by weight of particulate sugar;

(c) from about 3.5% to about 4.5% by weight of caramel powder; and (d) from about 12% to about 18% by weight of malt extract.

10. The process of claim 9 wherein the powdered non-dairy creamer comprises between about 45% and 55% vegetable fat by weight of the non-dairy creamer.

11. The process of claim 10 wherein the vegetable fat is coconut oil.

12. The process of claim 9 wherein the flavor enhancing salt is sodium chloride, the particulate sugar is sucrose and the thickening agent is carboxymethylcellulose.

13. The process of claim 9 wherein said process comprises admixing from about 1% to about 20% by weight of an added protein source wherein the added protein source is sweet dairy whey solids.

14. The process of claim 13 wherein said process comprises admixing from about 5% to about 15% by weight of sweet dairy whey solids.

15. The process of claim 8 wherein the cocoa powder and particulate sugar are dry mixed together and then admixed into the dry beverage mix.

* * * * *